United States Patent [19]
Blanchard

[11] Patent Number: 5,483,619
[45] Date of Patent: Jan. 9, 1996

[54] METHOD AND APPARATUS FOR EDITING AN AUDIO SIGNAL

[75] Inventor: Simon Blanchard, Horley, England

[73] Assignee: U.S. Philips Corporation, New York, N.Y.

[21] Appl. No.: 29,252

[22] Filed: Mar. 10, 1993

[30]   Foreign Application Priority Data

Mar. 18, 1992 [GB] United Kingdom ............... 9205932

[51] Int. Cl.⁶ ................................................ G10L 9/14
[52] U.S. Cl. .................. 395/2.87; 395/2.21; 395/2.71
[58] Field of Search ........................ 395/2, 2.21, 2.28, 395/2.71, 2.87

[56]   References Cited

U.S. PATENT DOCUMENTS

| | | | |
|---|---|---|---|
| 4,691,359 | 9/1987 | Morito | 381/51 |
| 5,243,582 | 9/1993 | Yamauchi et al. | 369/32 |
| 5,347,478 | 9/1994 | Suzuki et al. | 364/715.02 |

OTHER PUBLICATIONS

The Full Motion System fn CD–I.
Jan Van der Meer IEEE/Nov. 1992.
A 16KB/S APC System with Adaptive postfilter and evaluation of its Performance Zarkadis et al. IEEE/Apr. 1988.

Primary Examiner—Allen R. MacDonald
Assistant Examiner—Richemond Dorvil
Attorney, Agent, or Firm—Richard A. Weiss

[57]   ABSTRACT

An audio signal editing method and apparatus for use with original sound data which is already compressed and encoded in predictive form, for example ADPCM. To edit a desired portion from the original audio data, the method and apparatus reconstruct (encoded PCM) audio data from the original (ADPCM) audio data and encode a non-predictive unit to replace a first original audio data unit of the desired portion. Thus, the desired portion is rendered independent of preceding sample values, without having to be recoded entirely. An enhanced method and apparatus encode further replacement units to eliminate noise introduced by the basic method.

19 Claims, 5 Drawing Sheets

METHOD AND APPARATUS FOR EDITING AN AUDIO SIGNAL

BACKGROUND OF THE INVENTION

The invention relates to a method of editing an original sequence of data units (e.g., ADPCM-coded data units) that encodes an original audio signal e.g., a PCM-coded digital audio signal to generate an edited sequence representing a desired portion of the original audio signal. The edited sequence predominantly comprises predictive data units for reproduction by a predictive decoder whose response to each predictive unit is partially dependent upon an existing state of the decoder, which decoder is nevertheless responsive to a non-predictive type of data unit. The invention further relates to an apparatus for performing such a method.

Apparatuses for editing digitally coded audio signals are today well known in various applications, and can be constructed, for example, by using a high performance personal computer with appropriate software and interfaces. One known example comprises Digidesign's "Sound Tools" DSP hardware and software together with an Apple Macintosh (Registered Trade Mark) computer. The audio data in known apparatuses typically comprises PCM-coded sample values of 16-bits per sample for highest-quality sound. Such data is relatively easy to process, but takes a large account of storage per second of coded sound, demanding high performance hardware for an apparatus in terms of both storage capacity (hard disk space, typically) and channel bandwidth.

There is an increasing demand for sound to be reproduced by lower-cost apparatuses, and to this end compression techniques involving predictive coding have been developed. As one example, a variety of Adaptive Delta Pulse Code Modulation (ADPCM) coding has been developed for storage and retrieval of sound via Compact Disc-Read Only Memory (CD-ROM) in standardized systems known as CD-ROM-XA (CD-ROM Extended Architecture) and CD-I (Compact Disc-Interactive). A CD-ROM-XA player is described in U.S. Pat. No. 5,019,816. A CD-I player is described in "CD-I: A Designer's Overview", edited by Philips International and published by Kluwer Technical Books, ISBN 9020121103.

The predictive nature of ADPCM coding means that samples of an original 16-bit audio signal can be encoded with only a few bits per sample, because they are encoded by reference to preceding sample values held in a predictive decoder. A non-predictive type of data unit is typically selected only for high frequency signals, as part of an adaptive control strategy aimed at maximize instantaneous signal to noise ratio. ADPCM coding allow sound data (still of reasonably high quality) to be stored and processed by a low-cost apparatus such as a CD-I player. However, the predictive nature of the coding means that a portion of the audio signal cannot be decoded without reference back to a point when the state of the decoder was known, for example, the start of the recording. For this reason, editing of sounds for these lower cost systems is still performed with PCM data on high-performance systems, with conversion to ADPCM format occurring only when the finished sequence is ready for transfer to CD-ROM.

Apart from the general desire for lower cost editing systems, there is a growing desire for authoring of software for personal computers and systems such as CD-I to be performed on a target system itself so that end users can become authors, and authors can work on prototypes that resemble the finished products as closely as possible. From this viewpoint, an authoring system for CD-I applications ideally comprises a CD-I player, albeit expanded with necessary resources such as an interface to a magnetic hard disk drive for re-writable storage of authoring software tools, data files and programs under development. There remains, however, no path in such a system for real-time uncompressed PCM data to be edited and transferred in real time to the audio output for auditioning of source data and edited data. Continually decoding and recoding the audio data between PCM and ADPCM formats would be too slow for interactive use and would also degrade the quality of the signal.

SUMMARY OF THE INVENTION

It is an object of the invention to enable audio data to be edited to subsequent reproduction by a predictive decoder using low-cost apparatus.

The invention provides a method as set forth in the opening paragraph, characterised in that the original sequence itself comprises predominantly predictive data units and in that the method comprises:

(a) decoding the original sequence to reconstruct the (encoded) audio signal at least up to and including the start of the desired portion;

(b) recoding the reconstructed audio signal at the start of the desired portion to generate a replacement data unit of the non-predictive type; and (c) linking the replacement data unit with subsequent units of the original sequence, thereby encoding the desired portion of the original signal independently of the existing decoder state.

The insertion of a replacement non-predictive unit at the edit point renders the encoding of the desired portion in the subsequent data units independent of sample values prior to the edit point. At the same time, there is minimal overhead in terms of processing time and storage occupation, because the original audio signal is re-coded only in the locality of the edit point. Moreover, degradation of the entire edited portion if avoided.

It is noted that ADPCM coding is also used for speech coding for digital telephony, and also for ROM storage in speech-synthesis chips. In these applications, where data compression is a priority over high fidelity, it is well known to eliminate coding of the pauses which make up 20 to 40 percent of natural speech signals, in a process often called "silence editing". Examples of silence editing can be found in U.S. Pat. Nos. 4,989,246, 4,622,828 and 4,691,359, and also in a paper entitled "Digital Voice Storage in a Microprocessor" by Flanagan et al, IEEE Transactions on Communications, Vol. COM-30, No. 2, (Feb. 1982), pages 336 to 345. The skilled reader will appreciate that this "silence editing" does not equate to the general purpose editing of ADPCM-coded sound within the meaning of the present application. The known processes merely record the presence of a period of zero amplitude, instead of ADPCM-coding a quiet signal for the equivalent period.

In ADPCM coding systems, such as that defined for CD-ROM-XA and CD-I, although the non-predictive data unit encodes absolute signal values, the values are coarsely quantized to maintain data compression. For this reason, it is unlikely that a replacement non-predictive unit can reproduce the sample values that were encoded by the original sequence exactly, resulting in noise at the start of the edited portion. In practice, this noise is found to be unobstrusive.

However, an enhanced method embodying the invention is defined for use where the noise introduced by the basic method so far described is not acceptable.

In the enhanced method, step (b) further includes:

(i) determining whether the non-predictive replacement data unit reproduces with a predetermined tolerance the original audio signal as encoded by the original sequence, at least to the extent that it can affect the signal as encoded by the subsequent data units; and (ii) if not, generating as many further replacement data units to follow the non-predictive replacement unit as are necessary to obtain the predetermined tolerance; and in step (c) the further replacement units are linked in sequence between the non-predictive replacement data unit and subsequent data units of the original sequence. The tolerance can be set to zero (exact matching or to whatever level renders the noise acceptable.

In the known ACPDM coding systems, each predictive data unit comprises a number of data words that encode error values for a respective number of samples or the original audio signal and further specifies a set of one or more parameters controlling the operation of the decoder in relation to data words of that unit. In a compatible embodiment of the enhanced method just described, in step (b)(ii) a plurality of different parameter sets are used to generate a plurality of candidate units to become the further replacement data units, the further replacement data units being selected from among the candidate data units in accordance with predetermined criteria. Relatively few candidates need be considered if they are chosen sensibly. If processing time permits, evaluation of more candidates may yield a replacement unit which more accurately reproduces the original audio signal. The parameter set may include, for example, a range parameter for use by the decoder in deriving the encoded error value from each data word of the data unit and/or a filter parameter selecting at least one feedback coefficient for use by the predictive decoder in predicting each sample value.

In performing the basic or enhanced methods, the original sequence may be stored at known locations in a first storage unit while step (c) comprises storing the replacement unit(s) in a second storage unit together with a reference to the storage location of the subsequent data units of the original sequence. This avoids overwriting the original data at the edit point and avoids copying the original sequence unnecessarily. The linking reference allows the edited portion to be supplied to the ADPCM decoder for auditioning the edit. The first and second storage units could be part of the same memory but typically the first storage unit will comprise a mass storage unit such as a magnetic or optical disc, while the second storage unit comprises a working RAM of the system. Of course, parts of the original data will be copied from the mass memory into RAM for processing when required.

A method embodying the invention may further comprise an additional step:

(d) linking the desired portion encoded in step (c) to other portions similarly encoded, thereby encoding a compound audio signal which is the concatenation of the desired portion.

In such an embodiment, the original sequence of data units may be stored at known locations in a first storage unit while step (c) comprises storing the replacement unit(s) in a second storage means together with a reference to the storage locations of the subsequent data units of the original sequence, and step (d) comprises storing with the replacement unit/storage reference stored in step (c) a pointer to a replacement unit/storage reference similarly stored for one of the other portions.

If storage space permits, the decoding of step (a) can be performed once for the entire sequence and the PCM values stored for reference in step (b).

The invention further provides an apparatus for editing an original audio signal, the apparatus comprising:

(a) a unit for storing an original data sequence in which the original audio signal is encoded by a sequence of predominantly predictive data units;

(b) a second storage unit;

(c) a user interface unit by which a user of the apparatus can indicate a desired portion of the original signal; and (d) a control unit adapted to edit the original audio signal in accordance with a method embodying the invention as set forth above.

BRIEF DESCRIPTION OF THE DRAWINGS

Embodiments of the invention will now be described, by way of example, with reference to the accompanying drawings, in which.

DESCRIPTION OF THE PREFERRED EMBODIMENTS

Figure 1:
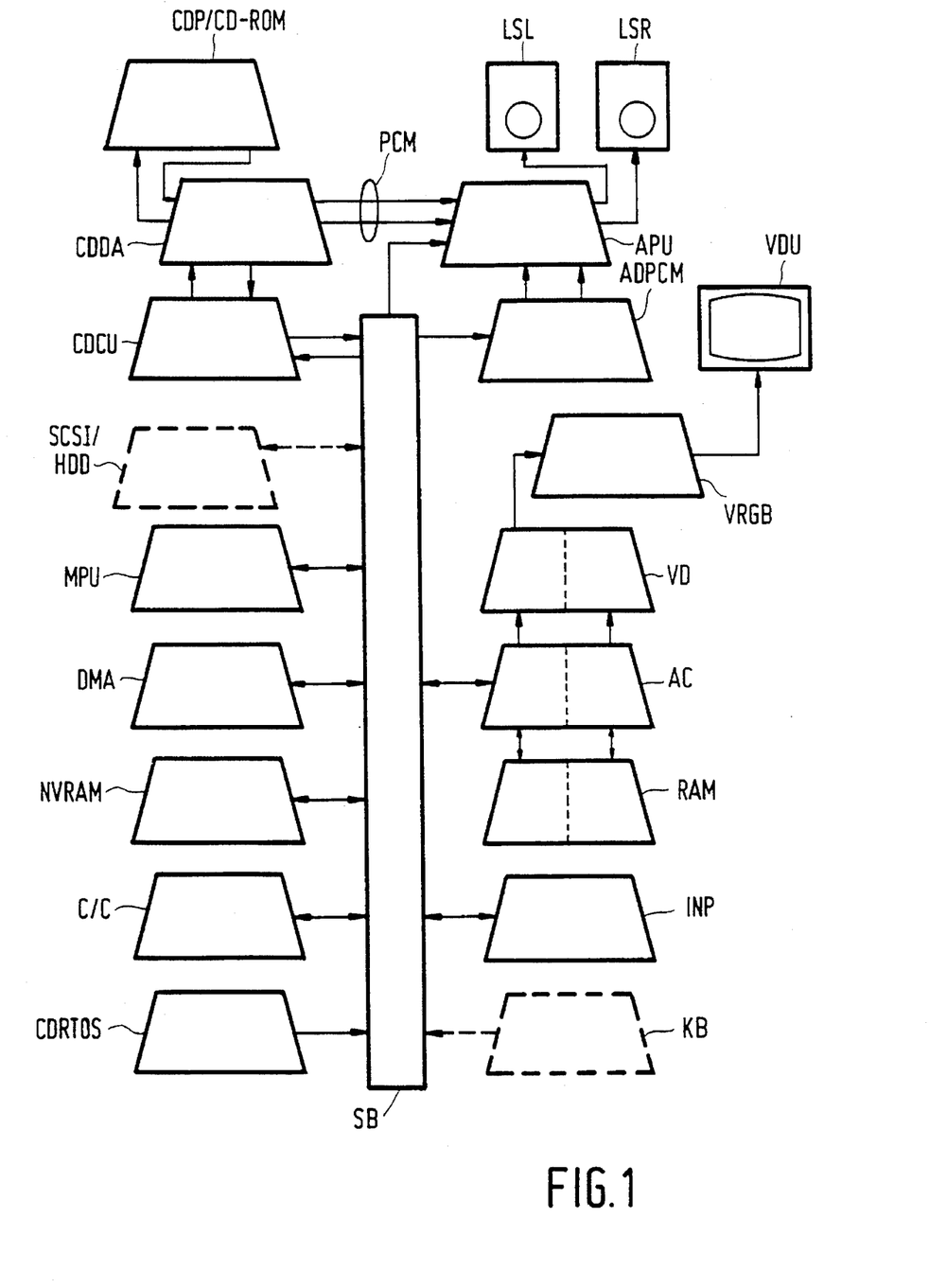
FIG. 1 shows in a block schematic form a Compact Disc-Interactive (CD-I) player, including an ADPCM decoder, but also being expandable to form an audio editing apparatus in accordance with the invention.

FIG. 1 shows in block schematic form a CD-I player which is, for example, a target reproducing apparatus for ADPCM sound data edited in accordance with the invention. The apparatus in FIG. 1 comprises a standard CD player module CDP, functioning also as a CD-ROM drive, a compact disc digital audio decoder CDDA and a compact disc control unit CDCU. The decoder CDDA is connected directly, for supplying 16-bit PCM sound data, to an audio processing unit APU which feeds two loudspeakers LSL and LSR. The control unit CDCU is connected to a system bus SB along which various digital signals are passed, including, in particular, data read from the CD-ROM. The system bus SB is also connected to a microprocessor unit MPU, a direct memory access controller DMA, a non-volatile random access memory NVRAM, a clock calendar unit C/C, a read-only memory (ROM) containing a real-time operating system CDRTOS, a pointing device INP and an access controller AC. The access controller AC controls reading from and writing to a random access memory RAM which is split into two banks zero and one. The access controller AC is also connected to a video decoder VD which in turn feeds a video generator VRGB, the output of which is connected to a video display unit VDU. The system bus SB is still further connected to an adaptive pulse code modulation decoder ADPCM which feeds the audio processing unit APU. A description of a CD-I base case decoder as shown in FIG. 1 is given in the Philips/Kluwer textbook cited in the introduction.

The video decoder VD in the CD-I player can read picture information which has been transferred from a compact disc (CD-ROM) to the random access memory RAM. This leads to the generation of appropriate video signals for the VDU by the video generator VBCB. The Philips/Kluwer (i.e., the original PCM sample value) describes how various picture coding formats are available.

Figure 2:
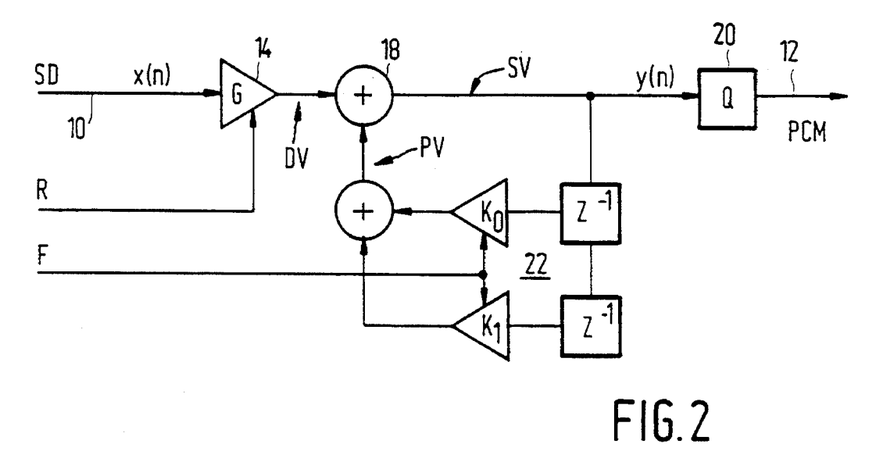
FIG. 2 shows in more detail an ADPCM decoder of a CD-I player.

FIG. 2 shows an ADPCM audio decoder of a reproducing apparatus such as the CD-I player shown in FIG. 1 or a CD-ROM-XA player. The decoder receives at its input 10 ADPCM sound data words SD (4-bits or 8-bits each) from a record carrier and generates 16-bit PCM sample values at an output 12. The sound data words SD are grouped into sound units of twenty-eight (28) words, corresponding to twenty-eight PCM samples. For each sound unit SU the decoder also receives a filter value (predictor selector) F and a range value r.

The CD-I specification provides three quality levels of ADPCM coding: A, B and C. Levels A and B have a 37.8 kHz sample rate, while Level C has only a 18.9 kHz sample rate. Level A has sound data words SD of only 4-bits per sample. For Level A, the range value R ranges from 0 to 8, while in Levels B and C, the range value R ranges from 0 to 12. The method of operation is essentially the same for all levels. For simplicity, Level B only will be used as an example in the following description.

In the decoder of FIG. 2, the 4-bit sound data words SD are fed to a gain unit 14 which scales them into 16-bit words by multiplying them by a factor $G=2^{12-R}$. (For Level A, G would equal to $2^{8-R}$). In other words, gain unit 14 performs a binary left shift of 12–R places. Thus, a sound data word SD=0101 binary (5 decimal) becomes anything from 0101 0000 0000 0000 (20480 decimal) with a range value R=0, down to 0000 0000 0000 0101 (5 decimal) with R=12. These are 16-bit differential audio values or prediction error values DV. The differential values DV are added an adder 18 to predicted values PV to give sample values SV, and these are rounded by a quantizer 20 to give the 16-bit PCM audio sample values PCM at the decoder output 12. Positive and negative values are represented by adoption of two's complement convention throughout, the gain unit 14, for example, providing the necessary "sign extend" function when scaling negative values.

The predicted values PV have greater precision than 16-bits and are derived from past outputs of the adder 18 by a predictor 22. The predictor comprises two single-sample delays ($Z^{-1}$), two gain units ($K_0$, $K_1$) and an adder to implement a second order IIR filter function with coefficients $K_0$ and $K_1$. These coefficients are determined by the filter value F for the present sound unit, in accordance with Table 1 below, so that four different predictors 22 are effectively available. The coefficients $K_0$ and $K_1$, are given in both decimal (d') and binary (b') format in Table 1. Since for F=0 ("Predictor 0") $K_0=K_1=0$, predictor 0 is a zero order filter, meaning that its output value SV is dependent only on the current sound data word SD, not on any previous sample values. Predictor 1 is a first-order filter ($K_1=0$), in which SV is dependent on data word SD and one previous value of SV, while Predictors 2 and 3 are second-order filters, in which SV depends on data word SD and two previous values of SV.

TABLE 1

| F | $K_0$ | $K_1$ |
|---|---|---|
| 0 | d'0.0 | d'0.0 |
|   | b'0.000000 | b'0.000000 |
| 1 | d'0.9375 | d'0.0 |
|   | b'0.111100 | b'0.000000 |
| 2 | d'1.796875 | d'-0.8125 |
|   | b'1.110011 | b'-0.110100 |
| 3 | d'1.53125 | d'-0.859375 |
|   | b'1.100010 | b'-0.110111 |

Figure 3:
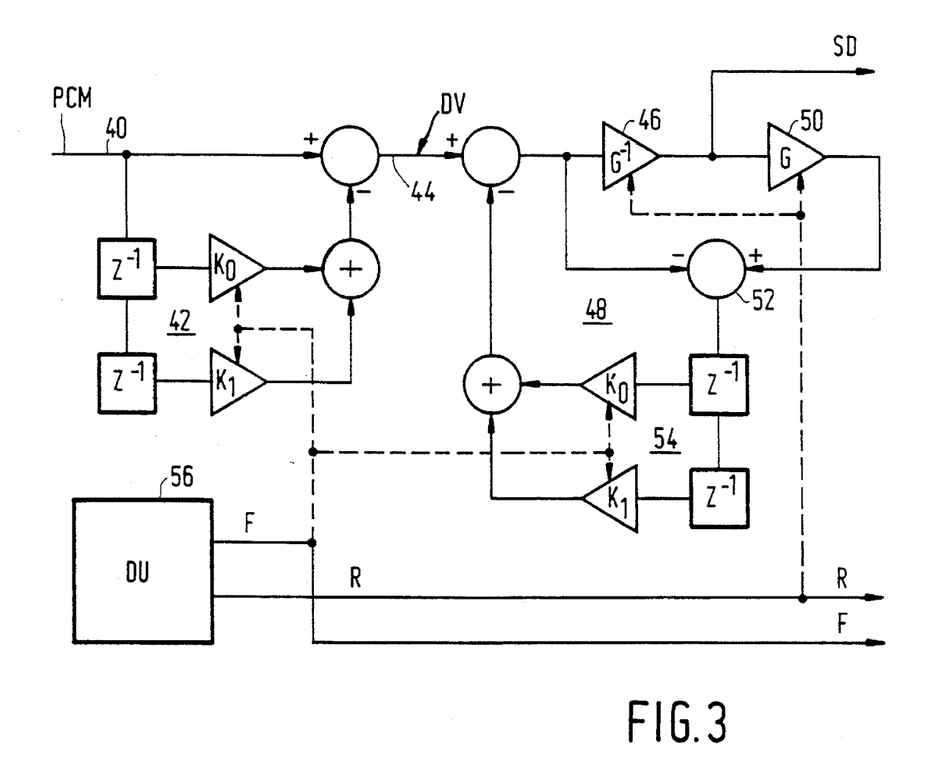
FIG. 3 shows an ADPCM encoder corresponding to the ADPCM decoder of FIG. 2.

FIG. 3 shows an ADPCM audio encoder corresponding to the decoder of FIG. 2. Incoming PCM audio samples are supplied in units of twenty-eight samples to input 40 of a predictor 42. The predictor coefficients $K_0$ and $K_1$ are determined (as for the decoder of FIG. 2) by a filter value F in accordance with Table 1. At its output 44, the predictor 42 produces 16-bit differential values DV which are scaled down at 48 by a factor $G^{-1}=2^{R-12}$ to give the twenty-eight 4-bit sound data words SD of a sound unit SU.

Since the sound data words SD comprise prediction errors quantized (truncated) from 16-bits down to only 4-bits (level B coding), substantial quantization noise is introduced at this point. This noise is eliminated as far as possible by a noise shaper 48. In the noise shaper 48, the truncated 4-bit sound data words SD are scaled up again by a factor $G=2^{12-R}$ at 50 and at 52 compared with the non-truncated values at the input of gain unit 46 ($G^{-1}$) to obtain the truncation error (noise). This noise is fed to a further predictor 54 having the same coefficients $K_0$ and $K_1$ as the main predictor 42 in the encoder and the predictor 22 in the decoder (FIG. 2). The filtered noise is subtracted from the differential values DV before they enter the gain unit 46 ($G^{-1}$), thereby compensating for the quantization or truncation noise.

The filter value F and the range value R are determined by a decision unit 56 (DU). The Decision unit 56 in fact causes operation of the encoder using all four predictors (F=0,1,2,3) for the sound unit of twenty-eight PCM samples. The decision unit 56 then selects the best combinations of F and R as follows:

(a) the peak values of the prediction error DV over twenty-eight samples are compared for all predictors, and the predictor (F value) giving the minimum peak error is chosen; and (b) the range value R (and hence $G^{-1}$) is chosen to normalize the errors DV according to their maximum value, and the noise shaping is executed to obtain the 28 sound data words SD.

The above strategy results in first-order and second-order filters being used for signals in the low and middle frequencies, with the zero-order (straight through_ filter being used for high frequency signals. This achieves a high instantaneous signal-to-noise ratio (S/N), in spite of the high degree of data compression. Other strategies are of course possible for selecting filter and range values.

Figure 4:
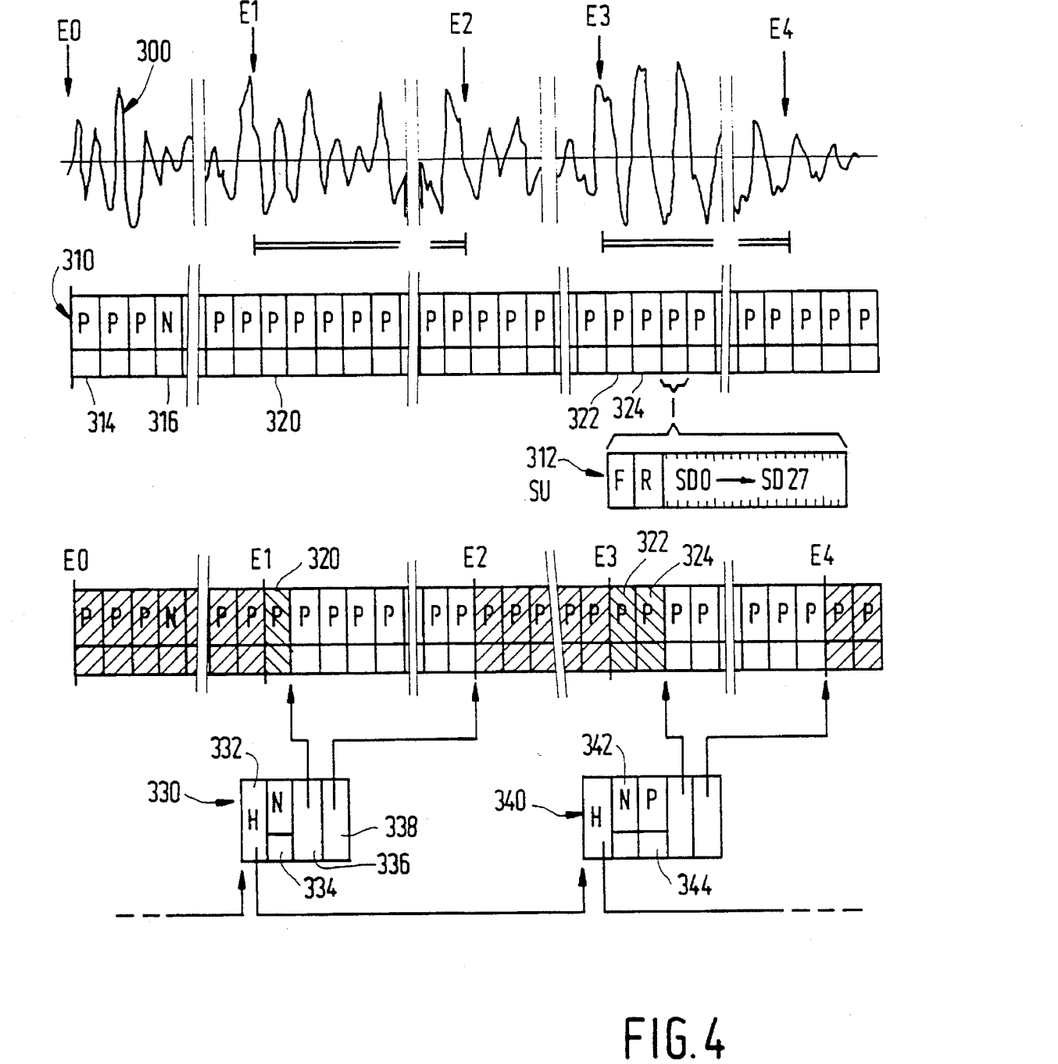
FIG. 4 illustrates the process of editing ADPCM audio data in accordance with the invention.

FIG. 4 illustrates ADPCM coding and subsequent editing of an audio signal. An (encoded) audio signal is represented at 300 as an analogue waveform, but is actually a sequence of 16-bit PCM samples reconstructed from a sequence of ADPCM sound data units SU shown at 310. Each sound unit SU, of which one is shown in detail at 312, contains sound data words SD for twenty-eight audio samples, plus parameter values F and R for the unit. The values F and R can be represented in a single sound parameter byte. In a sequence coded at level B, each sound unit SU comprises a sound parameter byte and twenty-eight 4-bit sound data words SD0 to SD27. For storage on CD-ROM, the parameters and sound data words SD of a group of eight sound units SU are interleaved and combined into a sound group SG of 128 bytes, and 18 sound groups SG are combined into one sector of CD-ROM storage. A sub-header in the CD-ROM sector identifies the level of coding used, specifies stereo/mono and contains a channel number, for example, so that different language channels can be interleaved on the disc. For Level A, coding only four sound units SU fit into a sound group of 128 bytes. For Level C coding, there are eight sound data units SU in a sound group, but each lasts twice as long because of the lower sample rate during playback. To avoid the problems of de-interleaving and re-interleaving the sound data, it can be assumed that the editor will work only at sound group boundaries. At level B coding, each sound group SG corresponds to a time period of less than 6 milliseconds, which is ample resolution for audio editing.

In FIG. 4, five points of interest are marked E0 to E4. E0 is the start of the audio signal, and the corresponding first sound unit 314 is a predictive unit (P). This is permissible because the decoder delay elements ($Z^{-1}$, FIG. 2) are always reset to zero at the beginning of reproduction. A subsequent unit 316, however, is a non-predictive unit (N) i.e. the filter value F is zero for this unit and the zero-order predictor Predictor 0 will be selected in the decoder. Each of the twenty-eight sound data words SD in the non-predictive unit 316 encodes an absolute value for the corresponding sample, without reference to previous samples. With range value R=8, for example, a sound data word b'1101 (−3 decimal) would represent a signal level of b'1111 1111 1101 0000 (−48 decimal). With a range value R=8, a sound unit SU can represent sample values from −128 to +112 decimal in steps of 16 ($2^{12-R}=2^4=16$). The range value R will be chosen as the smallest which allows representation of the peak magnitude among the twenty-eight samples, so as to reduce quantization noise as much as possible.

To achieve better accuracy at lower frequencies with only 4 bits per sample (Level B coding), the majority of sound units SU are encoded predictively (P), as described above with reference to FIG. 3. If a predictive unit is first order (F=1), then the values encoded by it will depend not only on the sound data words SD0 to SD27, but also on the last sample value (SV) of the previous unit. For a second-order predictive unit (F=2 or 3) the decoded values will depend on the last two samples of the previous unit. In either case, the values encoded by a predictive unit depend on the content of all preceding units, back to the most recent non-predictive (N) unit, unit 316 for example. Since audio segments are likely to last for several seconds or even minutes, the value encoded for a given sample may depend on thousands of sound data units SU. This is in contrast to the decoder is always known at the start of each video line.

Suppose, then, that it is desired to make an edited sequence of ADPCM-coded sound units comprising the portions E1–E2 and E3–E4 of the original sequence concatenated. It is not possible simply to concatenate the corresponding sequences of ADPCM sound units (sound groups), because the values encoded by unit 320 at point E1 depend on all the units from 316 onwards. Similarly, the values encoded by the sound unit 322 at E3 depend on all the units from 316 onwards. For this reason, it is conventional to edit files of full 16-bit PCM audio data on a powerful personal computer or workstation and only perform ADPCM coding on the finished edited audio signal for storage on CD-ROM. Expensive hardware is required because of the volume of uncompressed PCM data that must be stored and transferred in a PCM editing system.

It is always advantageous if authoring can be performed on the target system or its equivalent, and a personal computer with a CD-ROM-XA drive or an expanded CD-I player would make an ideal low-cost authoring system. The CD-I player of FIG. 1, for example, can be expanded in a manner known per se, to include a full keyboard KB and a standard SCSI interface adapter (both shown dotted in FIG. 1). The interface adapter SCSI allows connection to magnetic hard disk drives (HDD) for mass re-writable storage, and other peripherals for the capture and storage of source material and programs. Unfortunately there is no path in the CD-I player for uncompressed PCM data to be processed by the microprocessor MPU and supplied in real time to the audio processor APU. At the same time, decoding and re-coding the ADPCM data from a new entry point would consume a large amount of processing time, multiply the amount of ADPCM data and (unless the original uncompressed PCM source material is available) introduce new quantisation noise at every pass.

Figure 5:
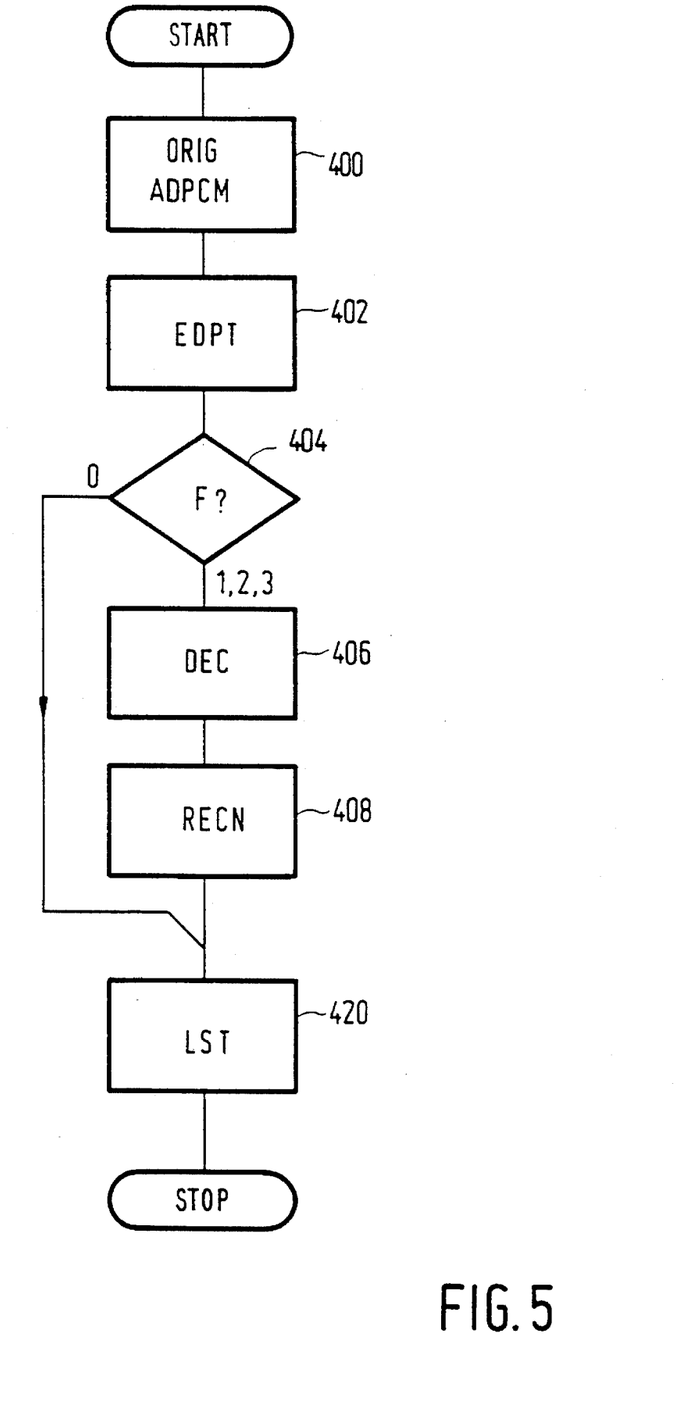
FIG. 5 is a flowchart of a basic ADPCM editing process.

FIG. 5 is a flowchart for a method of editing ADPCM audio data in which recording occurs only in the region of the edit point. The steps in the method are as follows:

400: An original sequence of ADPCM data units are received in a data file (310, FIG. 4), including predominantly predictive units (P). The data file (310) may be stored in RAM or on the hard disk (HDD) of the apparatus described.

402: A portion of the audio signal (E1 to E2, FIG. 4) is identified by the operator for use in the edited sequence. An edit point unit (320) is identified as forming the start of the portion.

404: If the edit point unit (320) is non-predictive (N; F=0), proceed to step 420.

406: If the edit point unit (320) is predictively coded (P; F=1,2,3), reconstruct the PCM audio signal as it is encoded by the original ADPCM sequence, retaining at least all samples of the edit point unit.

408: Recode the PCM samples of the edit point unit with a zero order predictor (N; F=0) to generate a replacement unit (334). This can be used in place of the original edit point unit (320) to allow the portion E1–E2 of the audio signal to be replayed through the decoder without regard for the existing state of the decoder (previous samples).

420: To preserve the original ADPCM data (310) intact, the edit point unit is not overwritten with the replacement unit. Rather, a linked list structure is assembled with list element (330) comprising a header (332;H), the zero order replacement unit (334;N), a pointer (336) to the next following unit in the stored ADPCM data and a pointer (338) to the last sound data unit in the portion E1–E2.

For the performance of step 406, the reconstructed PCM can be generated only as required by rapid decoding from the start of the original sequence (data unit 314), or from a most recent non-redictive unit (316), up to the edit point unit. If memory permits, however, some or all of the reconstructed PCM data may be pre-stored (for example on the hard disk HDD if not in RAM) to enable quicker access to the reconstructed values. The PCM values may also be used to generate a display of the audio waveform similar to that shown at 300 in FIG. 4. These PCM values remain stored for reference only, not playback, since there is no real-time path for PCM audio from the RAM of the editing apparatus to the audio decoder. Cueing and auditioning of the edits made is performed by supplying the original or edited ADPCM data sequence to the ADPCM decoder under microprocessor control.

The header generated in step 420 has a field for a link pointer identifying a further list element 340 so that any number of edited portions can be linked as if they formed a single sound segment. The results of editing can be auditioned in this form, without corrupting the original ADPCM data 310. When the final edited sequence has been constructed in list form, the sound units of the edited portions can be concatenated with the replacement unit(s) into a single ADPCM data file for inclusion in a CD-ROM program or the like.

The skilled reader will appreciate that the zero order replacement unit 334 cannot generally encode the exact PCM values that were encoded by the original edit point unit 320. This is because only 4-bits precision is provided per sample at Level B or C coding (8 bits for Level A coding, but still not exact). Thus, when the unit 334 is played followed by the remaining, predictive units of the portion E1–E2, some noise is introduced which persists, because the predictive units produce PCM values dependent on the last one or two sample values encoded by the replacement unit. It may be that this noise is acceptable, and the simple editing technique described in relation to FIGS. 4 and 5 will suffice. Otherwise, an enhanced method can be employed to eliminate this noise.

The second list element 340 shown in FIG. 4 defines the portion E3–E4 of the edited sound and is produced by the enhanced method of editing. The enhanced method aims to ensure that the exact PCM sample values are left in the decoder after the replacement unit as were encoded by the original PCM data 310. To this end, it is generally necessary not only to replace the edit point unit 322 with a zero order replacement unit, but also replace one or more subsequent units (324 etc.) with predictive (or non-predictive) units, until the final PCM sample values encoded by the replacement units are the same as those encoded by the original ADPCM units. In the example of portion E3–E4, PCM sample values encoded by sound data units 322 and 324 have been recoded to generate units 342 (N) and 344 (P), which are stored in the list element 340. The list element 340 further points to the first original sound data unit after unit 324.

Figure 6:
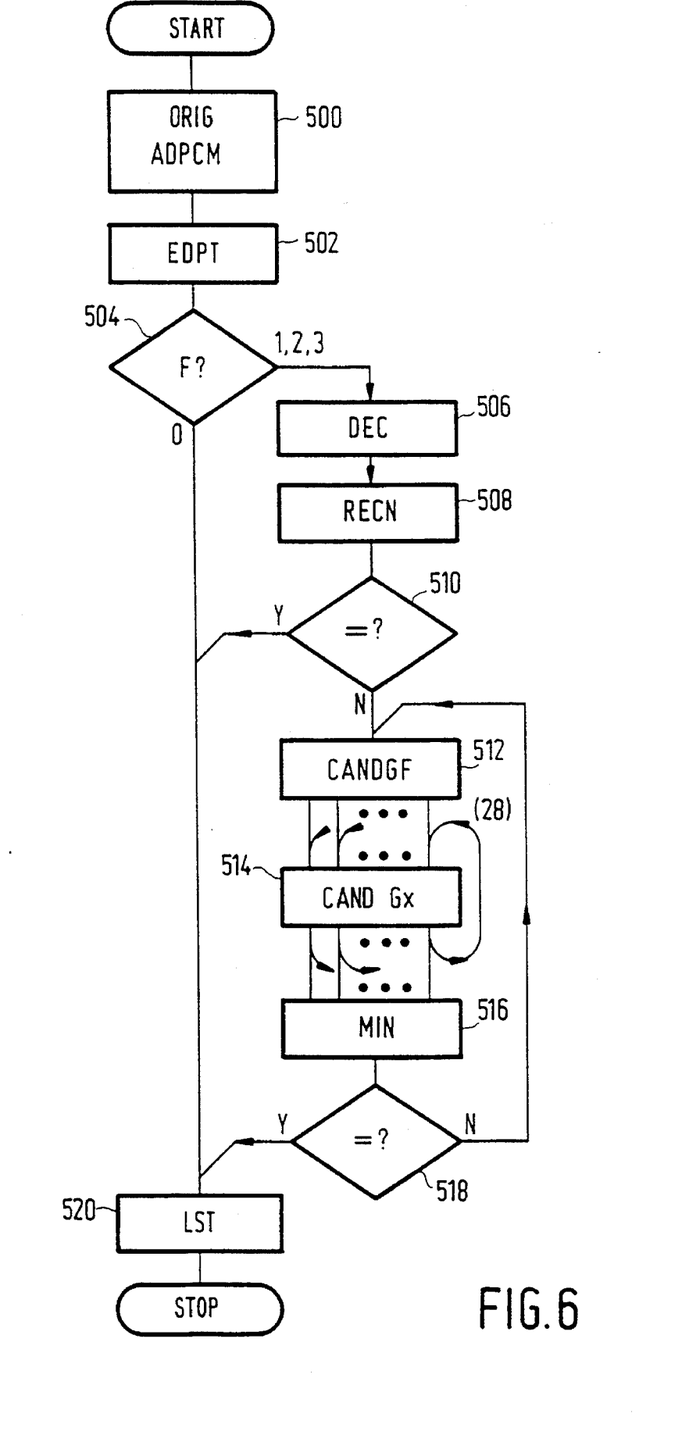
FIG. 6 is a flowchart of an enhanced ADPCM editing process in accordance with the invention.

FIG. 6 is a flowchart of the enhanced editing operation, in which steps 500 to 508 and 520 correspond to the like-numbered steps 400–408 and 420 in the basic method discussed with and shown in FIG. 5. In the enhanced method, as applied to the edit point at E3 in the example of FIG. 4, the sample values encoded by the new non-predictive unit 342 are tested at 510 for equality with the values encoded by the original unit 322. That is not to say that all twenty-eight samples are tested for equality: the last sample or samples are tested, in so far as they can affect subsequent samples. In other words, if the following unit 324 is a first order unit (F=1), only the last sample need be equal; if the unit 324 is a second order unit (F=2 or 3), the last two samples must be equal.

If equality is found at step 510, then no persistent noise will result from the replacement of unit 322 by the non-predictive unit 342 generated at 508, and the method proceeds as in the simple method of FIG. 5 to generate the list element at 520. In the majority of cases, however, the non-predictive replacement unit 342 will be unable to reproduce exactly the last sample(s), in which case the enhanced method proceeds to generate one or more further replacement units by the iterative process of steps 512 to 518, to be described below.

Before describing the steps 512 to 518, the problem to be solved is considered. The ADPCM decoder (FIG. 2) implements a simple difference equation relating the current output sample value $y(n)$ to the current input value $x(n)$ and past output values $y(n-1)$ and $y(n-2)$. This is Equation 1 below, in which G is the gain value $2^{12-R}$ for the sound data unit.

$$y(n)=Gx(n)=K_0 y(n-1)+k_1 y(n-2) \qquad (1)$$

$$Gx(n)=y(n)-K_0 y(n-1)-K_1 y(n-2) \qquad (2)$$

Equation 1 can be rewritten to give Equation 2, in which $Gx(n)$ is expressed in terms of $y(n)$, $y(n-1)$ and $y(n-2)$. If the value $y(n)$ is regarded as the originally encoded (i.e., the original) PCM sample value, and the values $y(n-1)$ and $y(n-2)$ are regarded as the two past sample values residing in the ADPCM decoder, then $Gx(n)$ is the input value for the decoder that would cause the decoder to reproduce exactly the desired PCM sample value $y(n)$.

Unfortunately, only a finite set of values for $Gx(n)$ can be included in the ADPCM data, because sound data word $x(n)$ has only 4-bits (Level B coding), and gain value (i.e., the original PCM sample value) G is restricted to integer powers of two. Moreover, G must be the same for all twenty-eight samples of the replacement sound unit. These constraints are met by the iterative process of steps 512 to 518, which operates as follows:

512: Candidate gain values G are identified for the possible filter values F (candidate predictors).

514: For each candidate predictor and candidate gain value Equation 2 is used to find the input value $x(n)$ for the first sample which most closely encodes the originally encoded PCM sample value (i.e., the original PCM sample value) $y(n)$. This is repeated for all twenty-eight sample values in the current sound unit SU. For each new sample, $y(n-1)$ becomes $y(n-2)$, the $y(n)$ value actually encoded by the candidate predictor becomes $y(n-1)$ and the originally encoded (i.e., the original $y(n+1)$ becomes the "target" value $y(n)$.

516: Having recoded the twenty-eight samples using several candidate predictors, the "best" predictor is somehow chosen. For example, the best candidate may be chosen as the one for which the last encoded sample value or values is or are closest to the corresponding sample values as originally encoded.

518: The further replacement unit is tested to see if the last sample value or values are equal to the corresponding PCM samples as originally encoded (i.e., the original PCM samples). If so, the list element can be constructed (step 520). If not, a yet further replacement unit is generated, using the steps 512 to 518 over again. In the example of FIG. 4, only one further replacement unit 344 has been found necessary. The structure of the list elements 330, 340, allows for any number of replacement units to be accommodated.

For the first sample of each sound unit, steps 512 and 514 are faced with a very large number of candidate pairs $G, x(n)$ for each predictor. For example, at Level B or C coding there are 13 possible values of G (R=0 to 12) multiplied by sixteen possible values for $x(n)$: a total of 208 candidates. At Level A coding, there are 9×256=2304 candidates. To restrict the set of candidates to a small size, it is possible to guess that the best value of G will be the smallest value of G that allows coding of the peak PCM value for the new sound unit. The smallest value of G of course gives the best low-order accuracy. It would be more accurate to find the nearest value $Gx(n)$ for all ranges for each predictor, but this would greatly increase the computation required. In either case, since the number of candidates Gx(n) is finite, it will generally be convenient to pre-store a look-up table of all the possible values for Gx(n). Of course, once a candidate Gx(n) is chosen for the first sample, G is then fixed for the remainder of the sound unit.

There are of course many such trade-offs between quality and speed of operation. As a further example, it may be sufficient in steps 510 and/or 518 to test whether the sample values encoded by the replacement unit(s) fall within a certain tolerance range of the originally encoded values, rather than demanding exact equality.

From reading the present disclosure, still other modifications will be apparent to persons skilled in the art. Such modifications may involve other features which are already known in the design, manufacture and use of audio editing systems and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalization thereof, whether or not it relates to the same invention as presently claimed in any claim and whether or not it mitigates any or all of the same technical problems as does the present invention.

I claim:

1. A method of editing an original sequence of data units that encode a digital audio signal to generate an edited sequence of data units representing a desired portion of the digital audio signal, the data units of the original sequence predominately including predictive type data units which are each partially dependent upon one or more data units which precede that data unit in the original sequence, the method comprising:

(a) decoding a portion of the original sequence to reproduce a portion of the digital audio signal which includes a start portion of the desired portion;

(b) recoding the start portion to generate a replacement data unit which represents an edit start data unit of the original sequence that encodes the start portion, the replacement data unit being a non-predictive type data unit which is independent of the data units which precede the edit start data unit; and (c) linking the replacement data unit with one or more data units of the original sequence which are subsequent to the edit start data unit in generating the edited sequence.

2. The method as claimed in claim 1, further comprising, between steps (b) and (c):

(b/c 1) determining if decoding of the replacement data unit and data units of the original sequence which succeed the edit start data unit produces a replica of a portion of the digital audio signal which is within a predetermined tolerance; and (b/c 2) if the replica is not within the predetermined tolerance, generating as many further replacement data units for data units of the original sequence which succeed the edit start data unit as are necessary to produce a replica of a portion of the digital audio signal which is within the predetermined tolerance from the replacement data unit, the further replacement data units which have been generated and data units of the original sequence which succeed the data units for which further replacement data units have been generated.

3. The method as claimed in claim 2, wherein each of the data units which is a predictive type data unit includes a number of data words which encode error values for a respective number of samples of the digital audio signal and further specifies a set of one or more parameters for use in controlling decoding of the data words of that data unit, and in step (b/c 2), a plurality of different parameter sets are used to generate a plurality of candidate data units to become further replacement data units, the further replacement data units being selected from among the candidate data units in accordance with predetermined criteria.

4. The method as claimed in claim 3, wherein the set of one or more parameters for each of the data units which is a predictive type data unit includes a least a range parameter for use in deriving the error values.

5. The method as claimed in claim 3, wherein the set of one or more parameters for each of the data units which is a predictive type data unit includes at least a filter parameter selecting at least one feedback coefficient for use in predicting sample values for the samples.

6. The method as claimed in claim 2, wherein the edited sequence is generated by linking the replacement data unit with the further replacement data units which have been generated and one or more of the data units which succeed the data units for which further replacement data units have been generated.

7. The method as claimed in claim 2, wherein the original sequence is stored at known locations in a first storage means, and step (c) includes storing the replacement data unit and the further replacement data units which have been generated in a second storage means together with a reference to one or more storage locations of the one or more data units of the original sequence which are to be included in the edited sequence.

8. The method as claimed in claim 1, wherein the original sequence is stored at known locations in a first storage means, and step (c) includes storing the replacement data unit in a second storage means together with a reference to one or more storage locations of the one or more data units of the original sequence which are to be included in the edited sequence.

9. The method as claimed in claim 1, further comprising (d) linking the edited sequence with a second edited sequence generated in accordance with steps (a)–(c) to produce a compound sequence that encodes a compound digital audio signal which is a concatenation of at least two portions of the digital audio signal.

10. The method as claimed in claim 7, wherein the original sequence is stored at known locations in a first storage means; step (c) includes storing the replacement data unit and a first reference to one or more storage locations of the one or more data units of the original sequence which are to be included in the edited sequence as a first list element in a second storage means; and step (d) includes storing a pointer to a second list element, stored in the second memory means, in the first list element, the second list element including a second replacement data unit which is to be included in the second edited sequence and a second reference to one or more storage locations of one or more data units which are to be included in the second edited sequence.

11. The method as claimed in claim 1, wherein the original sequence is decoded in its entirety to reproduce the digital audio signal in its entirety in step (a) and stored in a memory means for use in step (b).

12. The method as claimed in claim 1, wherein the data units of the edited sequence predominately include predictive type data units which are each decodable partially on the basis of one or more data units which precede that data unit in the edited sequence.

13. The method as claimed in claim 1, wherein the replacement data unit is decodable independently of the other data units included in the edited sequence.

14. The method as claimed in claim 1, wherein the digital audio signal is a PCM-coded audio signal and the data units of the original sequence are ADPCM-coded data units.

15. An apparatus for editing an original sequence of data units that encode a digital audio signal, the data units of the original sequence predominately including predictive type data units which are each partially dependent upon one or more data units which precede that data unit in the original sequence, the apparatus comprising:

storage means for storing the original sequence;

interface means for enabling a user of the apparatus to selected a desired portion of the original sequence for editing; and editing means for generating an edited sequence of data units representing the desired portion of the digital audio signal from the original sequence, said editing means including means for:

decoding a portion of the original sequence to reproduce a portion of the digital audio signal which includes a start portion of the desired portion;

recoding the start portion to generate a replacement data unit which represents an edit start data unit of the original sequence that encodes the start portion, the replacement data unit being a non-predictive type data unit which is independent of the data units which precede the edit start data unit; and linking the replacement data unit with one or more data units of the original sequence which are subsequent to the edit start data unit in generating the edited sequence.

16. The apparatus as claimed in claim 15, wherein said edit means further includes means for:

determining if decoding of the replacement data unit and data units of the original sequence which succeed the edit start data unit produces a replica of a portion of the digital audio signal which is within a predetermined tolerance; and if the replica is not within the predetermined tolerance, generating as many further replacement data units for data units of the original sequence which succeed the edit start data unit as are necessary to produce a replica of a portion of the digital audio signal which is within the predetermined tolerance from the replacement data unit, the further replacement data units which have been generated and data units of the original sequence which succeed the data units for which further replacement data units have been generated.

17. The apparatus as claimed in claim 15, wherein said storage means includes a first storage unit for storing the original sequence at known locations therein, and a second storage unit for storing the replacement data unit therein together with a reference to one or more storage locations of the one or more data units of the original sequence which are to be included in the edited sequence.

18. The apparatus as claimed in claim 15, wherein said edit means further includes means for linking the edited sequence with a second edited sequence to produce a compounded sequence that encodes a compound digit audio signal which is a concatenation of at least two portions of the digital audio signal.

19. The apparatus as claimed in claim 18, wherein said storage means includes a first storage unit for storing the original sequence at known locations therein; and a second storage unit for storing therein (a) as a second list element, a second replacement data unit which is to be included in the second edited sequence together with a second reference to one or more storage locations of one or more data units of the original sequence which are to be included in the second edited sequence, and (b) as a first list element, the replacement data unit together with (i) a reference to one or more storage locations of the one or more data units which are to be included in the edited sequence and (ii) a pointer to the second list element.

* * * * *